(12) United States Patent
Koskinen et al.

(10) Patent No.: US 7,787,858 B2
(45) Date of Patent: *Aug. 31, 2010

(54) CHARGING IN COMMUNICATION NETWORKS

(75) Inventors: Juha-Pekka Koskinen, Hameenlina (FI); Juha Vallinen, Tampere (FI)

(73) Assignee: Nokia Corporation, Espoo (FI)

( * ) Notice: Subject to any disclaimer, the term of this patent is extended or adjusted under 35 U.S.C. 154(b) by 1594 days.

This patent is subject to a terminal disclaimer.

(21) Appl. No.: 10/478,013

(22) PCT Filed: May 17, 2002

(86) PCT No.: PCT/IB02/02811

§ 371 (c)(1),
(2), (4) Date: Dec. 30, 2003

(87) PCT Pub. No.: WO02/096085

PCT Pub. Date: Nov. 28, 2002

(65) Prior Publication Data

US 2004/0196816 A1 Oct. 7, 2004

(30) Foreign Application Priority Data

May 18, 2001 (GB) .................................. 0112202.7

(51) Int. Cl.
*H04M 11/00* (2006.01)
(52) U.S. Cl. ...................... 455/405; 455/406; 455/428; 455/445; 455/424
(58) Field of Classification Search ................ 370/338, 370/352–356; 455/406–408, 432.1–435.2, 455/403, 445; 709/228; 379/114.01–114.03, 379/114.1, 114.28
See application file for complete search history.

(56) References Cited

U.S. PATENT DOCUMENTS

| | | | | |
|---|---|---|---|---|
| 5,796,790 A | * | 8/1998 | Brunner ...................... | 455/406 |
| 6,185,414 B1 | * | 2/2001 | Brunner et al. ............. | 455/406 |
| 6,195,543 B1 | * | 2/2001 | Granberg .................... | 455/407 |
| 6,307,924 B1 | * | 10/2001 | Rosenberg ............. | 379/115.01 |
| 6,345,182 B1 | * | 2/2002 | Fabritius et al. ............. | 455/408 |
| 6,421,346 B1 | * | 7/2002 | Itoh et al. ................ | 370/395.7 |
| 6,477,150 B1 | * | 11/2002 | Maggenti et al. ............ | 370/312 |

(Continued)

FOREIGN PATENT DOCUMENTS

DE        199 40 400 A     3/2001

(Continued)

OTHER PUBLICATIONS

3G TS 32.015 V3.0.0 (Jan. 2001).*

(Continued)

*Primary Examiner*—Kamran Afshar
(74) *Attorney, Agent, or Firm*—Harrington & Smith

(57) ABSTRACT

According to one aspect of the present invention there is provided a method for transferring charging information in telecommunication system, the method comprising establishing a call between a first terminal and a second terminal, the establishment of the call being performed by the transmission of call setup messages according to a messaging protocol between the first network and the second network; and transmitting charging data between first and second charging units to indicate the basis of charging for the support of the call; wherein the call setup messages and the charging data are transferred according to the same messaging protocol.

37 Claims, 3 Drawing Sheets

U.S. PATENT DOCUMENTS

| | | | | |
|---|---|---|---|---|
| 6,636,502 | B1* | 10/2003 | Lager et al. | 370/352 |
| 6,650,886 | B1* | 11/2003 | Lundstrom | 455/406 |
| 6,654,599 | B1* | 11/2003 | Lundstrom et al. | 455/405 |
| 6,654,606 | B1* | 11/2003 | Foti et al. | 455/432.1 |
| 6,707,813 | B1* | 3/2004 | Hasan et al. | 370/356 |
| 7,058,165 | B2* | 6/2006 | Koskinen et al. | 379/115.03 |
| 7,116,968 | B2* | 10/2006 | Koskinen et al. | 455/406 |
| 2002/0026473 | A1* | 2/2002 | Gourraud | 709/203 |
| 2002/0051463 | A1* | 5/2002 | Higuchi | 370/466 |
| 2002/0068545 | A1* | 6/2002 | Oyama et al. | 455/406 |
| 2002/0127995 | A1* | 9/2002 | Faccinn et al. | 455/406 |
| 2002/0191597 | A1* | 12/2002 | Lundstrom | 370/356 |
| 2003/0112932 | A1* | 6/2003 | Johnston | 379/114.01 |
| 2003/0129962 | A1* | 7/2003 | Chaney | 455/406 |
| 2004/0078349 | A1* | 4/2004 | Syrjala et al. | 705/412 |
| 2004/0185826 | A1* | 9/2004 | Koskinen et al. | 455/406 |

FOREIGN PATENT DOCUMENTS

| | | |
|---|---|---|
| WO | WO 97/26739 | 7/1997 |
| WO | WO 99/66702 | 12/1999 |
| WO | WO 00/11859 | 3/2000 |
| WO | WO 00/69201 | 11/2000 |
| WO | WO 00/79759 | 12/2000 |

OTHER PUBLICATIONS

"Enable user choice in a system using application influenced policy", U.S. Appl. No. 60/246,501 (Nov. 6, 2000), 5 pgs.

"Triggering RSVP Host Functionality as Packets Arrive at GGSN in 3GPP Networks", U.S. Appl. No. 60/248,110 (Nov. 13, 2000), 4 pgs.

"IP Specific Elements in PDP Context Activation/Modification", U.S. Appl. No. 60/260,765 (Jan. 10, 2001), 7 pgs.

"QoS Pre-condition met", U.S. Appl. No. 60/260,766 (Jan. 10, 2001), 4 pgs.

"Authorization Token in PDP Context Activation/Modification in Bearer Establishment for SIP call Setup (QoS)", U.S. Appl. No. 60/267,737 (Feb. 9, 2001), 9 pgs.

"Building a Signalling Bearer for use with an IP Multimedia Subsystem", U.S. Appl. No. 60/269,572 (Feb. 16, 2001), 7 pgs.

"QoS characteristics for a UMTS bearer appropriate for IP signalling", U.S. Appl. No. 60/269,573 (Feb. 16, 2001), 26 pgs.

"Architecture for Packet Data Protocol Context Suitable for Signalling", U.S. Appl. No. 60/269,789 (Feb. 16, 2001), 7 pgs.

"SDP Support for QoS Based SIP Sessions", U.S. Appl. No. 60/273,678 (Mar. 6, 2001), 7 pgs.

"Enhancement of Authorization Token for RSVP Interworking", U.S. Appl. No. 60/275,354 (Mar. 13, 2001), 2 pgs.

"Use of GPRS APN in IMS/IPv6 Context", U.S. Appl. No. 60/354,523 (Sep. 26, 2001), 3 pgs.

"Method And Apparatus For Coordinating Charging For Services Provided In A Multimedia Session", U.S. Appl. No. 60/330,501 (Oct. 23, 2001), 76 pgs.

"3$^{rd}$ Generation Partnership Project; Technical Specification Group Services and System Aspects; QoS Concept and Architecture (Release 4)", 3GPP TS 23.107 V.4.0.0 (Dec. 2000), 36 pgs.

"3$^{rd}$ Generation Partnership Project; Technical Specification Group Services and System Aspects; End-to-End QoS Concept and Architecture", 3G TS 23.207 V1.0.0 (Nov. 2000), 28 pgs.

"3$^{rd}$ Generation Partnership Project; Technical Specification Group Services and System Aspects; End-to-End QoS Concept and Architecture", 3G TS 23.207 V1.1.0 (Jan. 2001), 42 pgs.

"3$^{rd}$ Generation Partnership Project; Technical Specification Group Services and System Aspects; End-to-End QoS Concept and Architecture", 3G TS 23.207 V1.3.0 (Mar. 2001), 45 pgs.

"3$^{rd}$ Generation Partnership Project; Technical Specification Group Services and System Aspects; IP Multimedia (IM) Subsystem—Stage 2 (3G TS 23.228 version 1.4.0)", 3G TS 23.228 V.1.4.0 (Nov. 2000), 102 pgs.

"3$^{rd}$ Generation Partnership Project; Technical Specification Group Services and System Aspects; IP Multimedia (IM) Subsystem—Stage 2 (3G TS 23.228 version 1.7.0)", 3G TS 23.228 V1.7.0 (Feb. 2001), 115 pgs.

"3$^{rd}$ Generation Partnership Project; Technical Specification Group Services and System Aspects; General Packet Radio Service (GPRS); Service description; Stage 2 (Release 1999), Sections 9.2.2.1 and 9.2.2.1.1", 3GPP TS 23.060, V3.5.0 (Oct. 2000), pp. 111-113.

"3$^{rd}$ Generation Partnership Project; Technical Specification Group Services and System Aspects; General Packet Radio Service (GPRS); Service description; Stage 2 (Release 1999), Sections 9.2.2.1 and 9.2.2.1.1", 3GPP TS 23.060, V3.6.0 (Jan. 2001), pp. 112-114.

"3$^{rd}$ Generation Partnership Project; Technical Specification Group Services and System Aspects; Telecommunication Management; Charging and billing; 3G call and event data for the Packet Switched (PS) domain (Release 1999)", 3GPP TS 32.015, V3.4.0 (Dec. 2000), 65 pgs.

Handley, M. et al., Network Working Group, Request for Comments: 2543, Category: Standards Track, "SIP: Session Initiation Protocol", Mar. 1999.

Rosenberg, J. et al., Network Grouping Group, Request for Comments: 3261, Obsoletes: 2543, Category: Standards Track, "SIP: Session Initiation Protocol", Jun. 2002.

Rosenberg, J. et al., Network Working Group, Request for Comments: 3262, Category: Standards Track, "Reliability of Provisional Responses in the Session Initiation Protocol (SIP)", Jun. 2002.

Rosenberg, J. et al., Network Grouping Group, Request for Comments: 3263, Obsoletes: 2543, Category: Standards Track, "Session Initiation Protocol (SIP): Locating SIP Servers", Jun. 2002.

Rosenberg, J. et al., Network Working Group, Request for Comments: 3264, Obsoletes: 2543, Category: Standards Track, "An Offer/Answer Model with the Session Description Protocol (SDP)", Jun. 2002.

Roach, A. B., Network Working Group, Request for Comments: 3265, Updates: 2543, Category: Standards Track, "Session Initiation Protocol (SIP)—Specific Event Notifcation", Jun. 2002.

* cited by examiner

CALLED PARTY IN VPLMN, HOME MODEL, CALL FROM PS

CHARGING IN COMMUNICATION NETWORKS

This invention relates to charging in communication networks, especially third generation (UMTS) networks.

The implementation of charging systems in third generation (3G) networks presents a number of difficulties. Some of these are detailed below.

First, when a subscriber (the A-subscriber) originates a call to another subscriber (the B-subscriber) it may happen that the B-subscriber is roaming outside his home network. In that situation there will typically be a need to pay for the leg of the call from the B-subscriber's home network to the network in which he is roaming. (That leg may, of course, be notional from the point of view of the traffic data that is actually transferred during the call, since such data may go directly from the network in which the A-subscriber is located to the network in which the B-subscriber is roaming). If the charging arrangement is that the A-subscriber is to pay for the leg then an indication of the charge to be made for the leg and any application services used by the B-subscriber for that leg must be sent to the entity that is responsible for generating billing data to the A-subscriber, which will be part of the A-subscriber's home network. It is to be expected that such an indication will be sent to or generated by the B-subscriber's home network. However, if the B-subscriber's home network is not the same as the A-subscriber's home network then a problem arises because no suitable means exists for transferring the indication to the A-subscriber's home network.

By comparison, in the GSM (Global System for Mobile Communications) system records for charges incurred in roaming are transferred from network to network with manual intervention by the networks' operators. This means that typically roaming charge information is exchanged at intervals of a few days.

Second, it has been recognised that when a call makes use of packet switched data transfer (e.g. by means of a GGSN) and also an IP multimedia session (e.g. by means of a media gateway) it is possible that charging data (e.g. in the form of charging data records (CDRs)) may be generated for both those types of session. That may be wasteful of processing in the network and may involve a subscriber being charged twice for the same call. In the GSM system this problem does not arise because the MSC has access to all the charging data that is relevant to a call.

Third, when a call is being established from one network to another there is a need to transfer data relating to the charging principles to be employed for the call. One reason for this is to make both networks aware of which of the originating and terminating subscribers will bear the costs of what elements of the call, and if necessary how the data on charging should be transferred to the entities responsible for billing those subscribers. Another reason is so that pre-paid billing can be implemented successfully. If a subscriber who is bearing costs for the call is a pre-paid subscriber, and some costs of the call will be generated by a network other than the one to which that subscriber belongs then data either on the state of the subscriber's pre-paid balance or on the basis for charging for the call must be shared between the networks so that the call can be terminated if the subscriber's balance is used up during the call. Relying on the transfer of charging "tickets" during the call is unlikely to be successful in this respect because the tickets are unlikely to be transferred fast enough to allow real-time comparison of the accumulated cost of the call with the subscriber's balance.

According to the present invention there is provided a method for transferring charging information in a telecommunication system, the method comprising establishing a call between a first terminal and a second terminal, the establishment of the call being performed by the transmission of call setup messages according to a messaging protocol between the first network and the second network; and transmitting charging data between first and second charging units to indicate the basis for charging for the support of the call; wherein the call setup messages and the charging data are transferred according to the same messaging protocol.

Preferred aspects of the present invention are set out in the dependant claims.

The present invention will now be described by way of example with reference to the accompanying drawings, in which.

Figure 1:
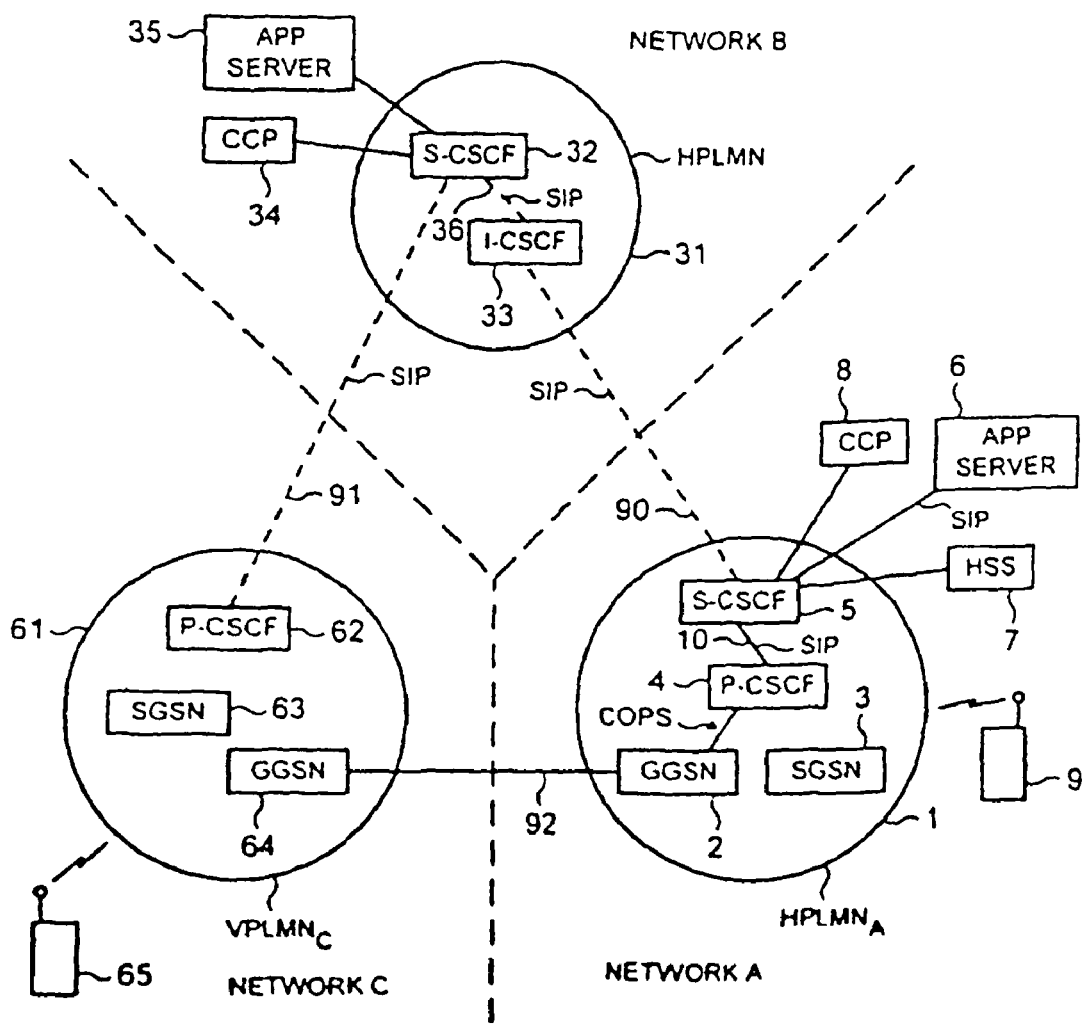
FIG. 1 is a functional block diagram of a third generation communication system.
Figure 1:
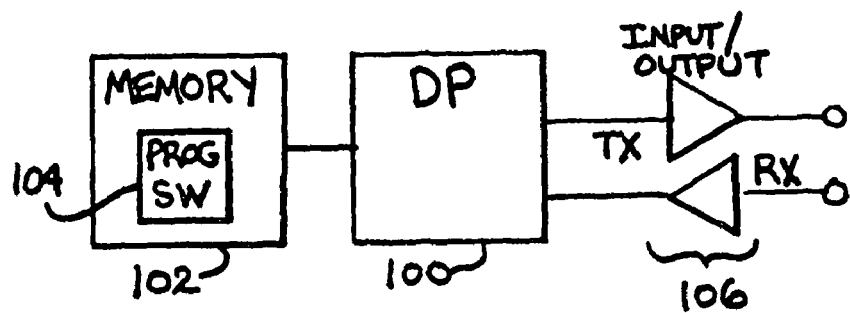

The system of FIG. 1 includes three interconnected third generation communication networks: network A, network B and network C. Each network has a core network section and other peripheral network units. Only the units that are pertinent to the present description are shown in FIG. 1.

The core network HPLMN (Home Public Land Mobile Network) 1 of network A comprises a GGSN (gateway GPRS support node) 2, an SGSN (serving GPRS support node) 3, a P-CSCF (proxy call service control function) 4 and an S-CSCF (serving call service control function) 5. In addition network A has an application server 6, an HSS (home subscriber server) 7 and a CCP (charging control point) 8. A subscriber terminal 9 is attached to network A. For the purpose of this example, network A is the home network of the subscriber of terminal 9.

The core network HPLMN 31 of network B comprises an S-CSCF (32) and an I-CSCF (interrogating call service control function) 33. Network B also comprises a CCP 34 and an application server 35.

The core network 61 VPLMN (Visiting Home Public Land Mobile Network) of network C comprises a P-CSCF (proxy call service control function) 62, an SGSN 63 and a GGSN 64. A subscriber terminal 65 is attached to network C. For the purpose of this example, network B is the home network of the subscriber of terminal 65, so terminal 65 is roaming in or visiting network C.

The general functions of most of the units in FIG. 1 are well known and will not be described in detail here. It should be noted that CCP 8 is responsible for collecting data on charges for the subscriber of terminal 9, CCP 34 is responsible for collecting data on charges for the subscriber of terminal 65, and HSS 7 stores information on subscribers of network A as an SPD (subscriber profile database). Each network may include a number of CCPs, each of which serves a subset of the subscribers to that network. Each network includes an HSS and among the subscriber data stored by the HSSs for each subscriber is the identity of the CCP that serves that subscriber. A CCPs could be a logical function that is part of the respective core network, for example as part of the CPS (Call Processing Server) or SCE. A CCP may be referred to as a CCF (charging control function).

FIG. 1 also shows in block diagram form a typical construction for each of the various illustrated network units and functions, including the terminals 9, 65, the GGSNs 2, 64, the SGSN 63, the various CSCF units 5, 32, 33, 62, the APP servers 6, 35, the HSS 7 and the CCPs 8, 34.

The network of FIG. 1 is an all-IP (internet protocol) network. In such a network, service control is handled by a subscriber's home network. The S-CSCF of a subscriber's home network acts to collect notices of charges levied for the activities of a subscriber to that network, or as a gateway to a unit that does so.

The CSCFs of the system of FIG. 1 operate so as to facilitate charging in the system, as will now be described in detail.

When the user of terminal 9 wishes to establish a call to the user of terminal 65 the following steps take place in order:

1. The user of terminal 9 initiates the call, causing terminal 9 to transmit to network A request for the initiation of a call with terminal 65. The signalling to establish the call itself is performed in the normal way.
2. The P-CSCF 4 is informed of the request to establish a call to terminal 65. P-CSCF 4 will be responsible for generating charging tickets for the activities performed by network A in order to support the call.
3. P-CSCF 4 signals S-CSCF 5 over link 10 to inform S-CSCF 5 of the call. S-CSCF will be responsible for collecting charging tickets for the call that are generated in network A and forwarding them to the appropriate destination. In this example the subscriber of terminal 9 (the A-subscriber for this call) will bear all the costs of the call. Such a situation—in which the originating subscriber bears the full costs of the call—is normal in present-day communication networks. The signalling from the P-CSCF 4 to the S-CSCF 5 includes the identity of the A-subscriber and the identity of the subscriber of terminal 65 to whom the call is directed (the B-subscriber).
4. The S-CSCF 5 accesses the HSS 7 of network A to determine the identity of the CCP for the A-subscriber. In this example that is CCP 8. The S-CSCF may also use the information from the HSS to find the basis on which the call is to be charged: for instance if the A-subscriber is a pre-paid subscriber or not, and on which tariff he is to be charged.
5. The S-CSCF 5 determines that the B-subscriber is a subscriber of network B. The S-CSCF 5 therefore signals the I-CSCF 33 of network B over link 90 to inform it of the call. I-CSCF 33 will be responsible for passing to network A information on charges accrued for the call from network B. The signalling from the S-CSCF 5 to the I-CSCF 33 includes an indication of the basis on which the call will be charged (specifically that all charges for the call will be borne by the A-subscriber) and the identity of the CCP for the A-subscriber. The signalling may also include an indication of the tariff to be applied to the call, and whether the A-subscriber is a pre-paid subscriber.
6. The I-CSCF 33 signals the S-CSCF 32 of network B over link 36 to inform it of the call. The signalling from the I-CSCF 32 to the S-CSCF 32 includes an indication of the basis on which the call will be charged (specifically that all charges for the call will be borne by the A-subscriber) and the identity of the CCP for the A-subscriber. The signalling may also include an indication of the tariff to be applied to the call, and whether the A-subscriber is a pre-paid subscriber. S-CSCF will be responsible for collecting charging tickets for the call that are generated in network B or for roaming charges due to roaming of terminals homed in network B and forwarding them to the appropriate destination.
7. The S-CSCF 32 signals the P-CSCF 62 of network C over link 91 to inform it of the call. The signalling from the S-CSCF 32 to the P-CSCF 62 includes an indication of the identity of the S-CSCF 32 whereby the P-CSCF 62 can send to the S-CSCF 32 information on charges levied by network C for the call. Such information is sent to S-CSCF 32 because S-CSCF 32 is the S-CSCF for the network that is home to the subscriber who is roaming in network C.

By this system, information has been put in place so that the A-subscriber can be subject to all the charges for the call.

Once the steps listed above have taken place and been acknowledged, traffic data can be transferred between terminal 9 and terminal 65, typically over link 92 between GGSN 2 and GGSN 64.

When the call is terminated CDRs (charging data records) are generated for the call by any entities that are to levy a charge for services provided in supporting the call. CDRs are generated by P-CSCF 62 for its services in providing the link to network C and by P-CSCF 4 for its services in providing the link from network A. In addition, CDRs may be generated by application servers such as 6 and 35 if they have provided services to support the call. Using the identity previously received over link 91, P-CSCF 62 forwards the CDR generated by it to S-CSCF 32. CDRs generated by application servers that are part of network B are also passed to S-CSCF 32. Having collected all the CDRs generated in respect of the B-subscriber for the call, the S-CSCF 32 consults the data previously sent to it to check the charging basis for the call. On finding that the A-subscriber will bear all costs of the call the S-CSCF 32 forwards the CDRs to the CCP 8 whose identity was previously received over link 90 from network A.

Meanwhile, when the call is terminated a CDR is generated by P-CSCF 4 for its services is supporting the call. P-CSCF 4 forwards that CDR to S-CSCF 5. Using the identity determined earlier from HSS 7 the S-CSCF 5 forwards that CDR to CCP 8.

As a result of this process, CCP 8 has received all the CDRs for the call. CCP 8 can apply those CDRs to the account of the A-subscriber, so that the A-subscriber can subsequently be billed for the charges that were levied during the call.

The messages signalled over links 10, 90, 36 and 91 in steps 3, 5, 6 and 7 as listed above may each include the specification of a CIE (charging information element). Each CIE specifies the charging parameters for the call, for instance which subscriber is to pay for which aspects of the call, which tariff is to be used and whether the A-subscriber has a pre-paid or post-paid subscription type.

If the call is a prepaid call then the information sent in the CIE can be used to predict the cost of the call as it takes place, so that the network is capable of terminating the call if the balance of the paying account is depleted.

The means of transfer of information between the network entities will now be described.

The information transferred over link 92 between GGSN 2 and GGSN 64 could be transferred according to the COPS protocol, as is data transferred from GGSN 2 to P-CSCF 4 in order to provide the P-CSCF 4 with information on the status of an ongoing or completed call.

In order to establish the call from network A to network C, the SIP (session initiation protocol) can be used. The SIP (session initiation protocol) has been developed to perform call/session control functions including assisting in establishing IP (internet protocol) sessions between subscribers. The SIP protocol provides a number of standardised requests and responses by means of which the session control functions may be performed between terminals. The SIP protocol is published as IETF RFC 2543 (and revisions), currently available from www.ietf.org. The SIP protocol specifies a means whereby information can be transferred during session setup, but the protocol is lightly standardised and other than for essential session functions it does not specify the nature of the content that is carried by SIP messages. SIP could be used to transfer information on the charging arrangements to be applied for a call, for example CIEs, as will be described below.

Figure 2:
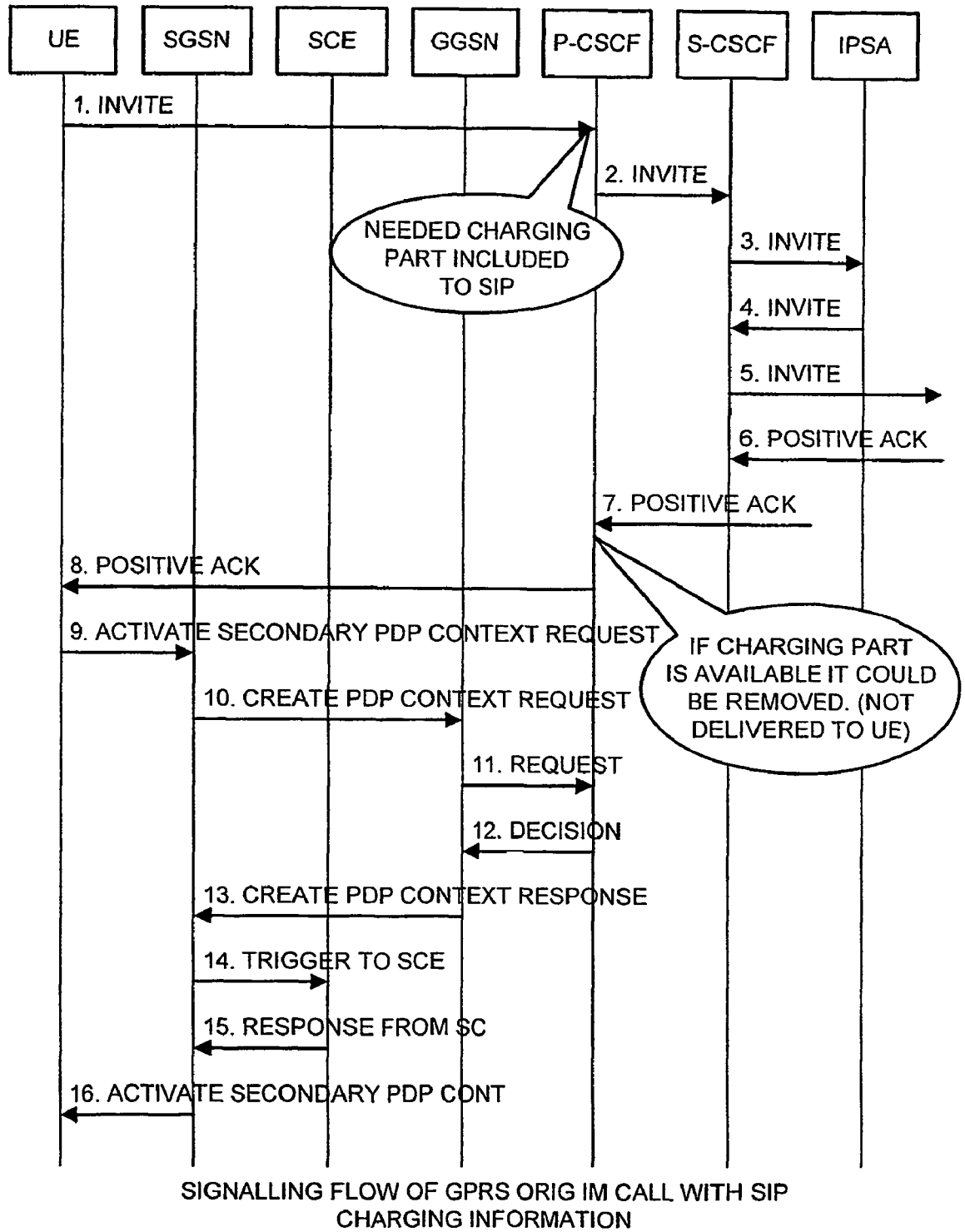
FIG. 2 illustrates data flow between entities of the system of FIG. 1.

FIG. 2 shows one example of how SIP could be used to transfer information on the charging arrangements to be applied for a call. FIG. 2 is a signalling diagram that shows the signalling to set up a call from an initiating terminal or item of user equipment (UE) towards another terminal/UE (not shown) via an SGSN, an SCE, a GGSN, a P-CSCF, a S-CSCF and an application server. The signalling steps in FIG. 2 are as follows:

1. INVITE from UE to P-CSCF.
    In the P-CSCF charging information could be added to SIP message.
2. INVITE from P-CSCF to S-CSCF.
    The S-CSCF could add/modify/store/include the charging information
3. Trigger to APSE (Application Server) (for A subscriber prepaid) with INVITE.
    The APSE could add/modify/store/include the charging information
4. Response from the APSE with INVITE (or corresponding).
    The S-CSCF could add/modify/store/include the charging information
5. INVITE from S-CSCF to I-CSCF (to find the B subscriber).
    The I-CSCF could add/modify/include the charging information
6. 200 OK from I-CSCF to S-CSCF.
    The S-CSCF could add/modify/store/include the charging information
7. 200 OK from S-CSCF to P-CSCF.
    All charging information removed if it is not allowed to be delivered to UE. This may be desirable for inhibiting fraud.
8. 200 OK from P-CSCF to UE.
9. Activate secondary PDP context request from UE to SGSN.
10. Create PDP context request from SGSN to GGSN
11. Authentication request from GGSN to P-CSCF (inc. PCF)
12. Decision from P-CSCF to GGSN.
13. Create PDP context response.
14. Trigger to SCE (for A subscriber prepaid).
15. Response from SCE.
16. Activate secondary PDP context accept.

As noted above, the S-CSCF does not need to transfer exactly the same charging information to the application server in message 3 as is transferred to the S-CSCF itself in message 2. Some information could be removed and/or added and/or changed.

The application server need not be involved in the final call, so it is generally preferable to retrieve the charging information from the application server to the S-CSCF before setting the call up.

The transfer of charging information using the SIP protocol enables more complicated charging scenarios in all IP networks. It could be used when SIP is used: between charging generating network elements and/or between network elements which modifies charging information.

A further advantage of the SIP protocol is that because in practice many SIP Servers (e.g. a typical APSE) use only the SIP protocol and because they can also generate charging information (e.g. CDRs) it is very convenient to transfer that charging information by means of SIP.

Figure 3:
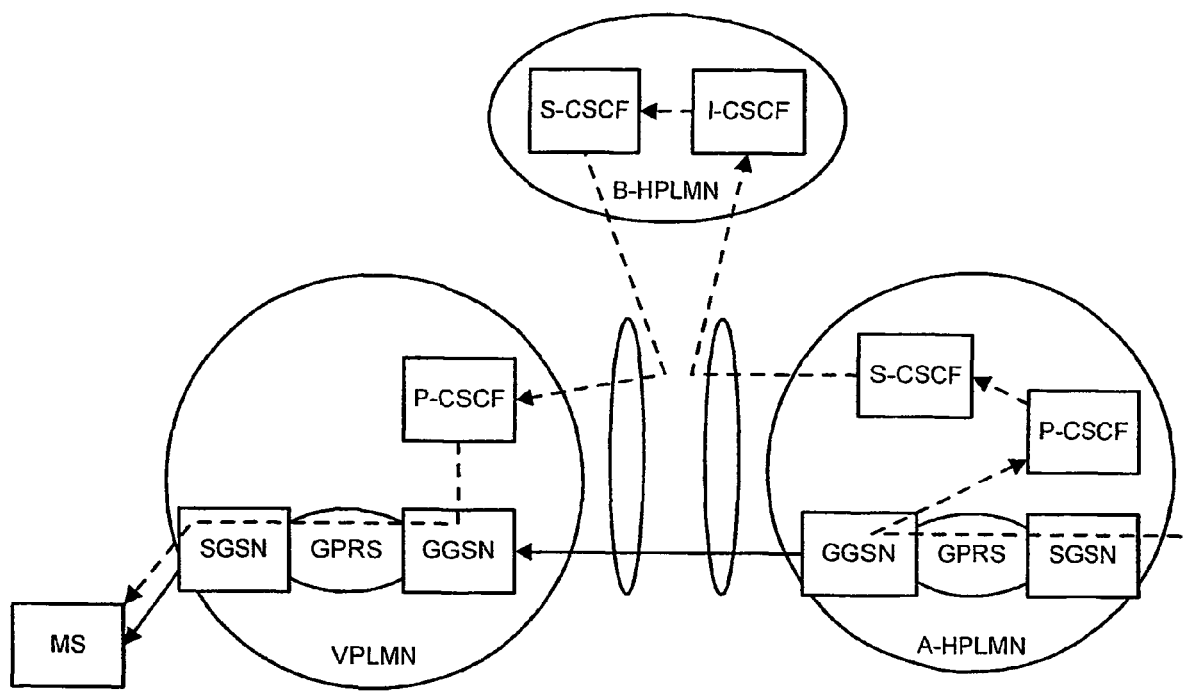
FIG. 3 is a functional block diagram of a third generation communication system.

FIG. 3 illustrates how the "call" is routed through the network. The charging related SIP signalling is not sent from the VPLMN P-CSCF onwards for reasons of fraud prevention. The related SIP charging message could be used as such (not needed for session signalling) or the charging part could be removed in related CSCFs.

The charging information in SIP could be defined to a method (INVITE, ACK, etc) or to one or more a status code definitions (for instance Informational 1xx). These messages should be identified to be charging related according to presented identification.

The SIP charging information can suitably provide to the charging control function/point all the information it needs on the parameters to be used for charging. That charging information (which is needed inside the network) carried by SIP will not be sent to terminals. So the charging related SIP signaling will not cross the P-CSCF (proxy call state/service control function) towards the user equipment. An exception can be made for information such as AoC (advice of charge) information which is provided for subscriber purposes.

A single third generation network may include a number of elements that may generate CDRs. These may be members of the IMS (IP multimedia subsystem) of the network, for instance the P-CSCF, S-CSCF, I-CSCF, BGCF (breakout gateway control function) and MGCF (multimedia gateway control function), or members of the PS (packet-switched) domain, for instance the SGSN and GGSN. The CDRs generated by the IP and PS domains may include different data. For example, a CDR generated by the GGSN (known as a G-CDR) typically includes information on the amount of packet-switched data transferred during the call to which the G-CDR relates, since the tariff for a packet-switched connection may be based on the amount of data transferred; whereas a CDR generated by the P-CSCF may include information on the time taken for the call, since the tariff for an IP connection may be based on that factor. If a call makes us of both IP and PS connections then it is possible that two CDRs may be generated for the call, and the result of this may be that a user is charged twice for the same call. To avoid this, the network may be arranged so that the IP and PS domains of the network cooperate so that only a single CDR is generated for any call.

It is proposed that in 3G networks the GGSN may authorize a PDP context (i.e. a bearer) against an IP multimedia session. The GGSN will send a request for this to the P-CSCF, which will return an authorisation if the session can be provided.

For charging co-ordination, it has earlier been proposed to use either PS domain identifiers (e.g. a charging ID generated for a PDP context by a GGSN) or IP multimedia subsystem identifiers (e.g. SIP Call ID). For charging co-ordination, this common identifier would be sent at bearer authorization from the PS domain to the IP multimedia subsystem or vice versa. In addition, at least the GGSN and the CSCF(s) (proxy and/or serving) would add this common identifier to CDRs.

For an IP multimedia session, it is not necessary to create CDRs both in PS domain and in IP multimedia subsystem. For content based charging, CDRs may be created in the IP multimedia subsystem while PS domain CDRs are not needed for charging purposes. Operators may, however, want to create CDRs for other purposes, e.g. for statistics.

To enable this to be done, if a bearer is authorized the P-CSCF could indicate to the GGSN that CDRs will be created in the IP multimedia subsystem. In this case, CDRs for charging purposes would not normally be created in the PS domain. If CDRs were, however, created in the PS domain for other purposes, an indication will be added to CDRs.

Examples of such indications are: indications that the call is to be free of charge (charging characteristics=free of charge), bearer authorized (or potentially even more detailed information on bearer authorization), whether content based charging is to be applied, etc.

In the case of IP multimedia, the data transfer between the P-CSCF and the GGSN could be performed using the COPS protocol. This may require the use of a dedicated parameter in COPS messages.

A similar addition to charging information may be used in case of other applications too, suitably for content-based charging purposes.

As an alternative, the GGSN may also indicate to the P-CSCF that it will create CDRs. In that case there would be no need to create CDRs in the IP multimedia subsystem. If CDRs were, however, created in the IP multimedia subsystem for other purposes, an indication could be added to the CDRs. This scenario is, however, unlikely, because content based charging is becoming more and more important.

These arrangements enable charging to be co-ordinated between the PS domain and the IP multimedia subsystem. By introducing a negotiation mechanism on CDR creation is between the PS domain and the IP multimedia subsystem, the need to create CDRs in both is avoided. This thus reduces the traffic resulting from CDRs. CDR creation is not needed in one of the two layers: 1) if CDRs are created in the IP multimedia subsystem, there is no need to create CDRs in the PS domain, or 2) if CDRs are not created in the IP multimedia subsystem, the PS domain creates CDRs.

The network may be configured so that if the GGSN receives information indicating that charging (and particularly the generation of CDRs) will not have to be done in PS domain, the GGSN transfers this information to the SGSN. Then the SGSN can indicate this status to the SCP. With this arrangement, in prepaid situations the SCP does not have to send time limits to SGSN. Instead prepaid can in this case be handled only by the IMS, so the SGSN does not have to send charging reports to the SCP.

That arrangement can also be applied the other way around. That is, if the P-CSCF receives information that charging will not have to be done in the IMS, the P-CSCF can transfer this information to S-CSCF. Then the S-CSCF can indicate this fact to the SCP. Then in prepaid situations those units do not have to transfer charging data between each other. In this case the prepaid is handled only in PS domain.

Operators may want to create CDRs for other purposes than charging. This is allowed even if P-CSCF indicates to GGSN that it will create CDRs. In this case, CDRs created in the PS domain should include an indication that the CDRs are not used for charging.

The applicant draws attention to the fact that the present inventions may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the inventions.

The invention claimed is:

1. A method, comprising:
   establishing a call between a first terminal and a second terminal, wherein the establishment of the call is performed by a transmission of call setup messages according to a messaging protocol between a first network and a second network; and
   transmitting charging data between a first charging unit and a second charging unit to indicate the basis for charging for the support of the call,
   wherein the call setup messages and the charging data are transferred according to the same messaging protocol.

2. A method as claimed in claim 1, wherein the first charging unit is a serving call service control function and the second charging unit is a proxy call service control function.

3. A method as claimed in claim 1, wherein the first charging unit is an application server and the second charging unit is a serving call service control function.

4. A method as claimed in claim 1, wherein the telecommunication system comprises a first network and a second network, the first terminal is operating in the first network and the second terminal is operating in the second network, the first charging unit is located in the first network and the second charging unit is located in the second network.

5. A method as claimed in claim 4, wherein the first charging unit in the first network is a serving call service control function and the second charging unit in the second network is an interrogating call service control function.

6. A method as claimed in claim 1, wherein the messaging protocol is a session initiation protocol.

7. A method as claimed in claim 1, wherein at least some of the charging data is transferred by a session initiation protocol message.

8. A method as claimed in claim 7, wherein at least some of the charging data is transferred by a session initiation protocol INVITE message.

9. A method as claimed in claim 7, wherein at least some of the charging data is transferred in connection with a session initiation protocol status code.

10. A method as claimed in claim 1, wherein the method comprises:
    transmitting a first call setup message from the first terminal to the first network; and
    forwarding the first call setup message to the second network with the addition of charging data.

11. A method as claimed in claim 10, wherein the first call setup message is a session initiation protocol invite message.

12. A method as claimed in claim 1, wherein the charging data includes an indication of the tariff to be used for the call.

13. A method as claimed in claim 1, wherein the charging data comprises an indication of whether the call is to be processed as being chargeable to a pre paid account.

14. A method as claimed in claim 1, wherein the charging information comprises a charging information element.

15. A method as claimed in claim 1, wherein the call is a packet switched call.

16. A method as claimed in claim 15, wherein the call is an internet protocol call.

17. A method as claimed in claim 1, wherein the first and second networks are all internet protocol networks.

18. A method, comprising:
    establishing a call between a first terminal and a second terminal, wherein the establishment of the call is performed by a transmission of call setup messages according to a messaging protocol between a first network and a second network; and
    transmitting charging data between a first charging unit and a second charging unit to indicate the basis for charging for the support of the call, wherein the call setup messages and the charging data are transferred according to the same messaging protocol;
    further comprising transmitting a call setup message including charging data from the second network to the first network; and forwarding the call setup message to the first terminal with the removal of at least some of the charging data.

19. A method as claimed in claim 18, wherein the data that is removed excludes advice of charge data.

20. A method as claimed in claim 18, wherein all the charging data is removed.

21. A method as claimed in claim 18, wherein one of the call setup messages is a session initiation protocol acknowledgement message.

22. An apparatus, comprising:
a first charging unit configured to transmit call setup messages according to a messaging protocol between a first network and a second network to establish a call between a first terminal and a second terminal, and to transmit charging data indicating the basis for charging for the support of the call between the first charging unit and a second charging unit, wherein the call setup messages and the charging data are transmitted according to the same messaging protocol.

23. The apparatus of claim 22, wherein the first charging unit is a serving call service control function and the second charging unit is a proxy call service control function.

24. The apparatus of claim 22, wherein the first charging unit is an application server and the second charging unit is a serving call service control function.

25. The apparatus of claim 22, the first terminal is operating in the first network and the second terminal is operating in the second network, the first charging unit is located in the first network and the second charging unit is located in the second network, wherein the first charging unit in the first network is a serving call service control function and the second charging unit in the second network is an interrogating call service control function.

26. A system comprising:
a first network and a second network;
a first terminal and a second terminal;
a first charging unit configured to transmit call setup messages according to a messaging protocol between a first network and a second network for establishing a call between a first terminal and a second terminal, and further configured to transmit charging data indicating the basis for charging for the support of the call between the first charging unit and a second charging unit, wherein the call setup messages and the charging data are transmitted according to the same messaging protocol; and
the second charging unit.

27. A system as claimed in claim 26, wherein the first terminal is operating in the first network and the second terminal is operating in the second network.

28. A system as claimed in claim 26, wherein the messaging protocol is a session initiation protocol.

29. A system as claimed in claim 26, wherein the charging data comprises a session initiation protocol message.

30. A system as claimed in claim 29, wherein the charging data comprises a session initiation protocol INVITE message.

31. A system as claimed in claim 29, wherein the charging data is transmitted in connection with a session initiation protocol status code.

32. A system as claimed in claim 26, wherein the charging data includes an indication of the tariff to be used for the call.

33. A system as claimed in claim 26, wherein the charging data comprises an indication of whether the call is to be processed as being chargeable to a pre paid account.

34. A system as claimed in claim 26, wherein the charging information comprises a charging information element.

35. A system as claimed in claim 26, wherein the call is a packet switched call.

36. A system as claimed in claim 35, wherein the call is an internet protocol call.

37. A system as claimed in claim 26, wherein the first and second networks are all internet protocol networks.

* * * * *